US012090349B1

(12) United States Patent
Steltzer et al.

(10) Patent No.: US 12,090,349 B1
(45) Date of Patent: Sep. 17, 2024

(54) DOUBLE-SIDED BREACHING TOOL

(71) Applicant: Granite Mountain Industries, LLC, South Portland, ME (US)

(72) Inventors: Gordon Steltzer, Saco, ME (US); John Paul Bousquet, Rochester, NH (US)

(73) Assignee: Granite Mountain Industries, LLC, South Portland, ME (US)

( * ) Notice: Subject to any disclaimer, the term of this patent is extended or adjusted under 35 U.S.C. 154(b) by 0 days.

(21) Appl. No.: 18/337,178

(22) Filed: Jun. 19, 2023

(51) Int. Cl.
*A62B 3/00* (2006.01)

(52) U.S. Cl.
CPC .................................... *A62B 3/005* (2013.01)

(58) Field of Classification Search
CPC ...................................................... A62B 3/005
See application file for complete search history.

(56) References Cited

U.S. PATENT DOCUMENTS 10,912,958 B1 * 2/2021 Nakash .................. A62B 3/005
2019/0022431 A1 * 1/2019 Hickerson .............. A62B 3/005

* cited by examiner

*Primary Examiner* — Nirvana Deonauth
(74) *Attorney, Agent, or Firm* — Caseiro Burke LLC; Nicholas A. McCrillis

(57) ABSTRACT

The present invention relates to a breaching device which may be used to gain access to a door, window, or other structure. More specifically, the present invention is a breaching device including a fixed breaching structure and a moving breaching structure to provide torque and angle forces on the structure to be breached. The fixed breaching structure includes a first fixed blade set arranged to remain in a fixed position while a first moving blade of the moving breaching structure is actuated to open a first gap. Then, if necessary, a second fixed blade set and a second moving blade of the device are used to complete the separation of the door from its frame. The second blade set may be used to complete the breach of the structure or may be designed as a multi-purpose tool to use on a different structure. The first fixed blades are relatively shorter than the second fixed blades. The first moving blade is shorter than the second moving blade.

15 Claims, 11 Drawing Sheets

DOUBLE-SIDED BREACHING TOOL

This invention was made with government support under contract number FA864922P0915 awarded by USAF Research Lab AFRL SBRK. The government has certain rights in this invention.

FIELD OF THE INVENTION

The present invention relates generally to an apparatus for breaching an entry or exit and method for breaching an entry or exit. More particularly, the present invention relates to a device that utilizes hydraulic pressure to gain access to an entryway or an exit. Still more particularly, the present invention relates to a device that utilizes a fixed breaching structure and a moving breaching structure to gain access to a locked door.

BACKGROUND OF THE INVENTION

Law enforcement, military, and/or other personnel are often required to gain entry to a building, room, or other area in which a closed, barricaded, or locked door prevents easy entry. Law enforcement personnel are often not equipped with tools capable of unlocking heavily locked or reinforced doors. As such, law enforcement and others having a need to access a location, need a device which can be carried, but provides sufficient angle and force application to a door jamb, hinge, or lock to gain entry.

There are various tools which provide law enforcement with methods of obtaining access to locked doors. These tools may include items such as crowbars, battering rams, explosives, or hinge rupturing tools. The existing tools used for such door breaching have limitations and hazards. For example, the use of explosives may or may not be effective in all cases and can be extremely hazardous to individuals on both sides of the door. A battering ram device may or may not break the door structure or material adjacent to the door lock. Hinge rupturing tools may not provide the sufficient force or effectiveness to gain entry to a locked or reinforced door.

Additionally, many doors have advanced features to provide additional security and strength to door, door frame, locks, or hinges. These features may include tighter door gap spaces or shorter door gap spaces to prevent an individual from applying the use of a tool, like a crowbar or other such device, which requires the user to insert the device into the door gap to generate separating force. These features may also include stronger metals, plastics, or other materials to provide greater adherence and strength to the door locks or hinges.

Those skilled in the art understand the requirements and characteristics of secured doors, entryways, or windows, or other entry/exit points. Secured doors are typically used when an ordinary door, hinge, and lock system is inadequate for the type of security needed. These more secure doors or entry and exit points are typically used in government buildings, safe rooms, and other areas where there is a need for heightened security or where sensitive information is held. Those skilled in the art understand the difficulties of breaching secured doors. Currently, there is not a specific device or method used for breaching doors or entry or exit points with heightened security. Other types of entry structures having heightened breaching resistance include, but are not limited to, jail cell doors, ship hatches or ship doors, sliding doors such as those on trains, and elevator doors. Currently, there does not exist a double-sided breaching device or a multi-purpose breaching device specifically for use with structures such as these.

What is needed is a device which may be used to breach heavily locked or reinforced doors, windows, and other types of entryways. The device should be readily available for use on demand, with minimal setup time. Further, the device should be capable of providing sufficient power, torque, and force to breach a heavily locked or reinforced door or entryway. Additionally, the device should be capable of providing a method to enter a narrow door gap otherwise arranged to limit access to an interior hinge or lock by a longer tool. The device should be able to create initial space to allow for deeper penetration angle and a method to create additional torque at such an angle to breach the door. Still further, the device should be capable of applying different forces, angles of force, and door gap entry features, as necessary, depending on the type of door, reinforcements, locks, or hinges. The device may have features that are designed for multiple types of breaching. For example, the device may have one set of features designed to breach a reinforced door while another set of features are designed to breach a ship hatch. What is further needed is a device which may be capable for use in breaching heightened security doors and other types of difficult-to-access entryways.

SUMMARY OF THE INVENTION

It is an object of the present invention to provide a device for applying force and angle sufficient to breach a locked, barricaded, or reinforced entry or exit. Further, it is an object of the invention to have a method of accessing deeply recessed hinges and locks, including those protected by very narrow door gaps. Still further, it is an object of the invention to be capable for use in breaching SCIF doors and other difficult-to-access entryways including but not limited to jail cell doors, ship hatches, ship doors, door hinges, sliding train doors, and elevator doors.

The present invention is a double-sided breaching tool device. The device has a fixed breaching structure, a moving breaching structure, a first fixed blade set, a second fixed blade set, a first shaft, a second shaft, and a power source. The power source may be a hydraulic fluid supply coupled to a hydraulic hose coupled to the moving breaching structure. The power source is used to deliver power, such as a hydraulic fluid through the hydraulic hose, to the device when the device is in use. The power source may alternatively be a compact battery-powered unit, air-powered unit, or other such power source. The combination of the device and the power source is lightweight enough to be transported by hand by a user. The invention is designed to deliver a substantial force to a structure to be moved or modified. The substantial force applied may be up to or exceeding 10,000 pounds of force, for example. Such structures include but are not limited to doors and windows. Other operations may be carried out using the apparatus.

The first fixed blade set and the second fixed blade set of the device are used to gain access to the structure that is being breached. The structure may be a door but not limited thereto. The first fixed blade set is used to establish entry through narrow gaps. One or more blades of the first fixed blade set has/have a thickness and/or length less than one or more blades of the second fixed blade set in order to fit into the narrow gap. The shape of a portion or all of the blades may be tapered, wedge-shaped, angular, curved, grooved, or otherwise shaped such that such blades may be securely inserted into a gap of a structure, such as a door, hatch, or other opening, may be breached as part of the breaching effort. Actuation of the extendible moving breaching structure when the first fixed blade set is engaged with a door is used to create a larger gap that enables insertion of the second fixed blade set. In the embodiment of the invention wherein the blade or blades of the second fixed blade set is or are longer than the one or more blades of first fixed blade set provides greater leverage to force the gap open wider than is possible with the first fixed blade set when the extendible moving breaching structure is extended. The load applied by the moving breaching structure has been found to be sufficient to open the gap wide enough to break the coupling of the entryway to its frame. In some cases, actuation of the moving breaching structure with just the first fixed blade set engaged in the door gap may be enough to complete the entryway breach. The one or more blades of the first fixed blade set and the one or more blades of the second fixed blade set are optionally designed with different lengths to provide multiple methods of applying force, torque, and angle to complete breach of the structure.

The different characteristics between the first blade set and the second blade set may further be configured to be intended for use with different structures. For example, the invention may be designed so that one blade set (the first blade set or the second blade set) is intended for use in breaching a door, and the opposing blade set is intended for use in breaching a ship hatch. In that embodiment of the invention, the first fixed blade set is configured to open a first type of structure and the second fixed blade set is configured to open a second type of structure, wherein the first type of structure and the second type of structure are different from one another. As a result, the configuration of the one or more blades of the first fixed blade set may be different from the configuration of the one or more blades of the second fixed blade set. For example, the one or more blades of the first fixed blade set may be flat or wedged while the one or more blades of the second fixed blade set may be curved or have a modified blade end, but not limited thereto. It is also a design of the invention to utilize the first blade set as a method of accessing a narrower, more difficult gap to access, with the second blade set to complete the breach once the gap has been enlarged.

In an embodiment of the invention, the first blade set has two first fixed blades, and the second blade set has two second fixed blades. When the first blade set or the second blade set is inserted into the gap, the fixed breaching structure and the moving breaching structure, together, cause separation of the door from the door frame. Once the device is in place in a door gap, the fixed breaching structure is designed to remain engaged with the door whereas the moving breaching structure is designed to be engaged with the door frame and separate from the fixed breaching structure to create a larger door gap and eventual breach. The action of separating the fixed breaching structure from the moving breaching structure in the door gap results in the breach of the door by using a desired force, torque, and angle applied to the door gap. The first blade set, the second blade set, or both may be designed with features or characteristics to target specific types of doors. That is, they may be other than specifically blade shaped.

The movement of the moving breaching structure is driven by the power source such as a hydraulic, pneumatic, mechanical, or electric source of power. The moving breaching structure includes a movable blade set that is coupled to a first actuation element and a second actuation element. The movable blade set includes a first blade and an opposing second blade. The first blade is relatively shorter than the second blade and the second blade is relatively longer than the first blade. The first and second blades of the movable blade set may be similar in configuration to the blades of the first breaching structure but not limited thereto. The first actuation element includes a first extension and a first housing. The second actuation element includes a second extension and a second housing. The first extension and the second extension are coupled at first ends thereof to a body of the movable blade set. The power source is coupled to the second end of the first extension. The second actuation element may contain an internal spring or other method of retracting the moving breaching structure to the original position after the power source and first actuation element have extended the moving breaching structure from the fixed breaching structure. The power source enables actuation of the moving breaching structure by extending the first extension from within the first housing and the second extension from within the second housing. The first actuation element and the second actuation element control the orientation of the device while in use, and minimize tilting, twisting, or other unwanted movement of the device while breaching is underway. The first extension and the second extension move substantially in unison, at the same rate. The user may utilize the power source to actuate the movement of the moving breaching structure by extending the first extension and the user may utilize the retraction method (such as an internal spring) by retracting the second extension. The user is able to selectably extend or withdraw the moving breaching structure to control the breach of the door or entryway.

DETAILED DESCRIPTION OF THE INVENTION

Figure 1:
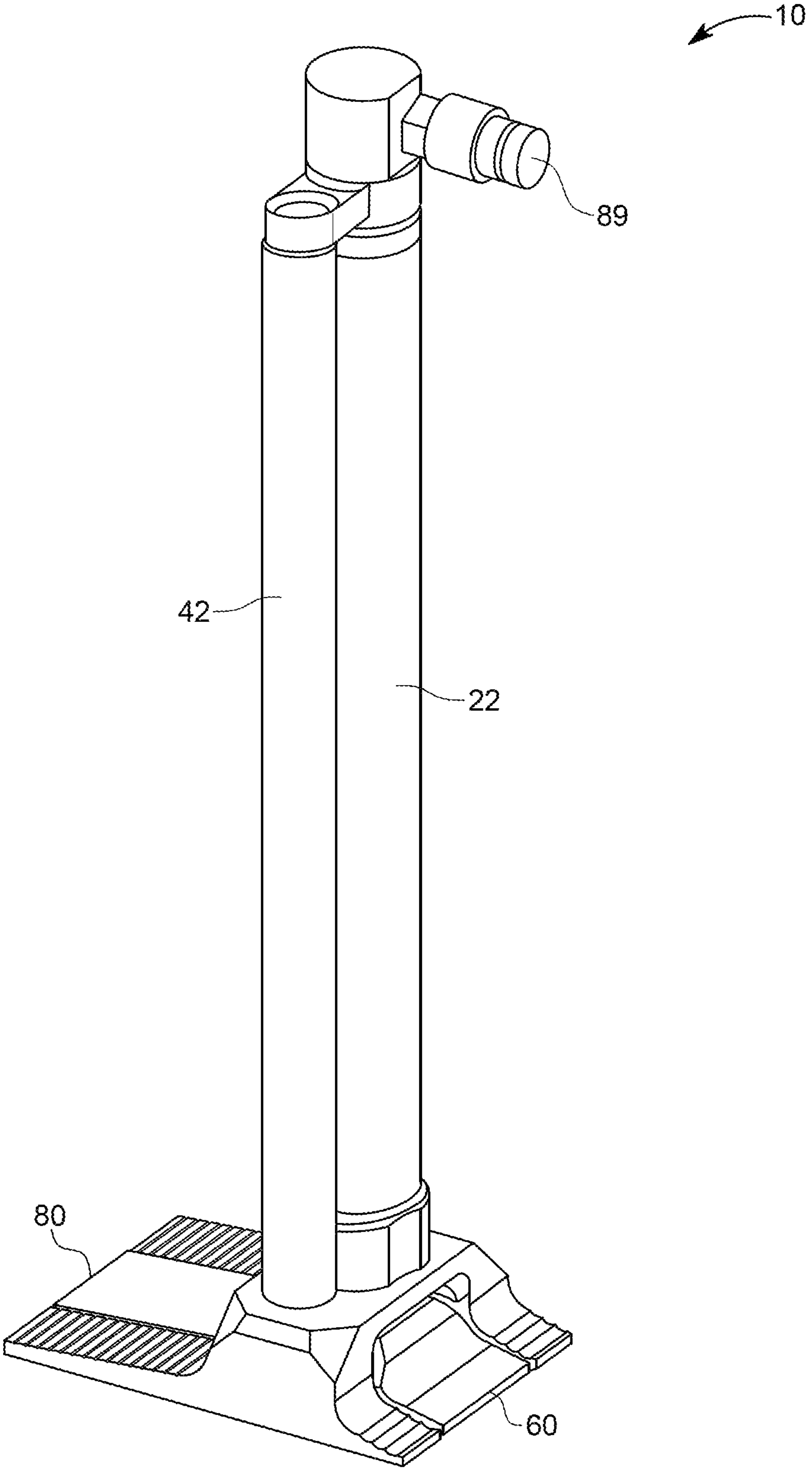
FIG. 1 is a first fixed blade set side perspective view of an embodiment of the device of the invention.
Figure 2:
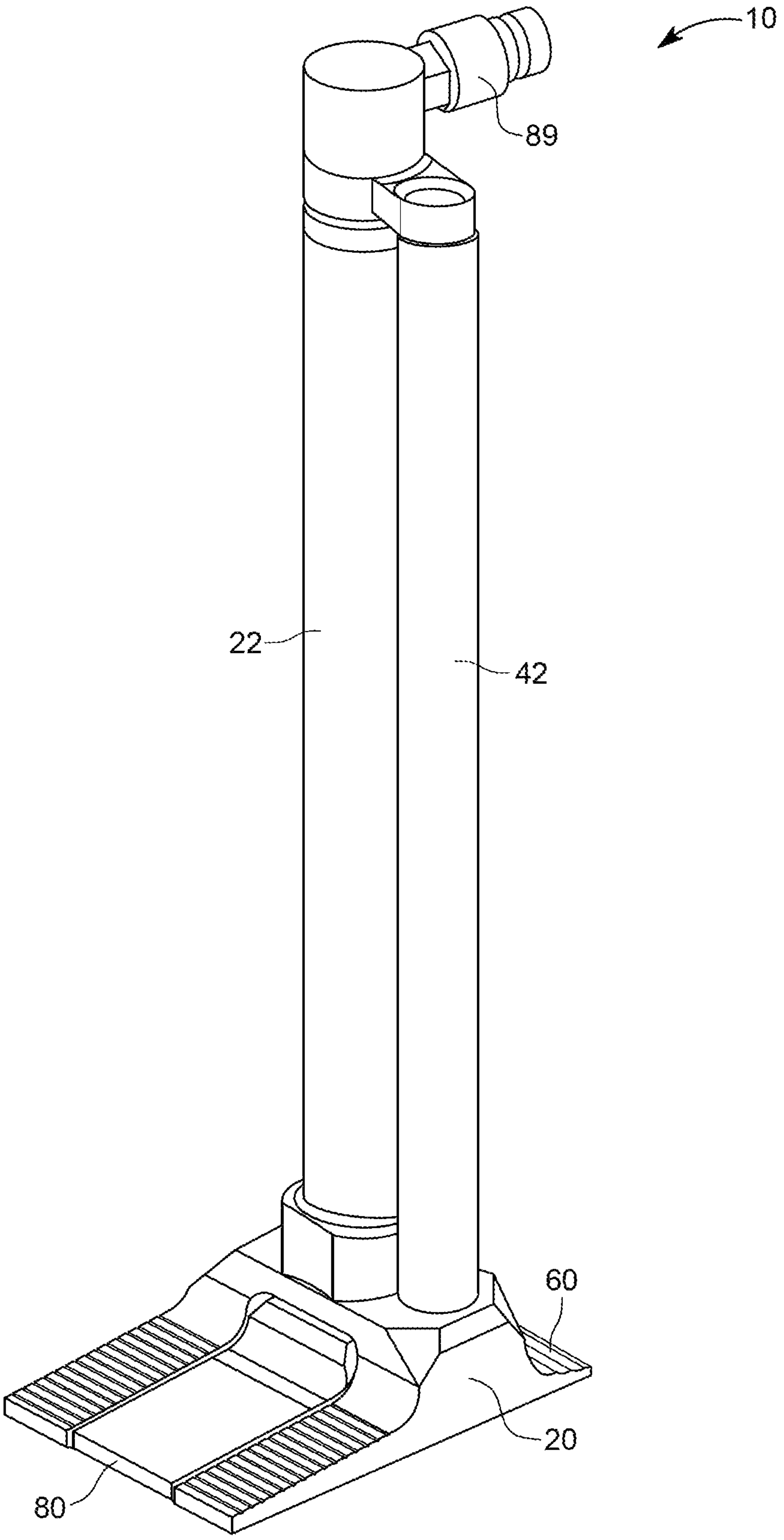
FIG. 2 is a second fixed blade set side perspective view of the device.

A double-sided breaching device 10 of the present invention is shown in FIGS. 1-13. The device 10 has a fixed breaching structure 20, a moving breaching structure 40, a first fixed blade set 60 of the fixed breaching structure 20, a second fixed blade set 80 of the fixed breaching structure 20, a moving blade set 61, a first actuation element 22, and a second actuation element 42, all of the moving breaching structure 40, and a power source coupling 89 that may be used to removably connect a power source 90 to the moving breaching structure 40. The power source 90 may be a compact, battery powered hydraulic power unit that supplies hydraulic power and control to the device 10 but is not limited thereto. The power source 90 may include a hydraulic hose 92 for coupling to the coupling 89 to supply hydraulic fluid to the moving breaching structure 40 to induce controlled actuation of the structure 40. Hydraulic fluid enters the first actuation element 22 creating pressure within and movement of the moving breaching structure 40. The second actuation element 42 houses an internal spring which creates retracting pressure on the moving breaching structure 40. When the hydraulic pressure of the first actuation element 42 is less than the mechanical spring pressure of the second actuation element 42, the moving breaching structure 40 is controllably retracted.

The first fixed blade set 60 and the second fixed blade set 80 of the fixed breaching structure 20 may be thin, heat-treated blades connected to each other by fixed collar 30. The device 10 is designed to be secured or held against a door 100, a door frame 102, or other structure the user wishes to breach. In an embodiment of the present invention, the first fixed blade set 60 has two first fixed blades 64. The two first fixed blades 64 are spaced apart from one another by first moving blade 62 of the moving blade set 61 and coupled together by fixed collar 30. The second fixed blade set 80 has two second fixed blades 84. The two second fixed blades 84 are spaced apart from one another by second moving blade 82 of the moving blade set 61 and coupled together by fixed collar 30. The device 10 may be inserted into a door gap 104, which is the space between the door 100 and the door frame 102. Additionally, the device 10 may be engaged with a door lock 106 or a door hinge 108. In an embodiment, once the device 10 is secured, the user may actuate the device 10 wherein either of the blade sets of the fixed breaching structure 20 remains engaged with the door 100 and the moving breaching structure 40 moves away from the fixed breaching structure 20 while the corresponding one of either of the moving blades is engaged with the door frame 102. When initially secured, the fixed breaching structure 20 and the moving breaching structure 40 of the device 10 are located along the same plane, residing in the door gap 104. The movement of the moving breaching structure 40 away from the fixed breaching structure 20 generates the separating force between the door 100 and door frame 102 to create the breach. In other embodiments, the first fixed blade set 60, the second fixed blade set 80, the first moving blade set 62, and the second moving blade set 82 may have one or more blades including but not limited to a plurality of blades more than two, as needed for use with the breaching structure.

As noted, the fixed breaching structure 20 includes the fixed collar 30. The moving breaching structure 40 has a moving collar 50. The first actuation element 22 includes a first housing 24 and a first extension 26. The second actuation element 42 includes a second housing 44 and a second extension 46. The first housing 24 and the second housing 44 are coupled to the fixed collar 30. A first end of the first extension 26 is coupled to the moving collar 50. The moving collar 50 has a socket 52. A second end of the first extension 26 is coupled to the power source 90. A first end of the second extension 46 is coupled to the socket 52 of the moving collar 50. A second end of the second extension 46 may house a retracting mechanism, such as an internal spring. The first housing 24 and the second housing 44 retain therein at least the first extension 26 and the second extension 46, respectively, therein. When the device 10 is actuated, the power source 90 creates pressure extending the first extension 26 from within the first housing 24 and the second extension 46 from within the second housing 44. The extension of the first extension 26 using the power source 90 creates the movement of the moving breaching structure 40. The first housing 24 and the second housing 26 remain in a fixed position coupled to the fixed breaching structure 20. The second extension 46 may be retracted back into the second housing 44 through the use of an internal mechanical return spring or a gas spring.

In an embodiment, once the device 10 is actuated, the moving breaching structure 40 extends away from the fixed breaching structure 20. The first moving blade 62 and the second moving blade 82 move in unison with the moving breaching structure 40, extending away from the two first fixed blades 64 and the second fixed blades 84. The extension of the first moving blade 62 from the two first fixed blades 64 creates the widening of the door gap 104 when the first blade set 60 is engaged. The first fixed blade set 60 is configured to fit into a tight or short door gap 104. The first fixed blade set 60 is used to generate a larger or wider door gap 104 in which the second fixed blade set 80 may fit when the device 10 is actuated.

In some embodiments, the first fixed blade set 60 is designed to be inserted into the door gap 104, apply force and pressure sufficient to widen the door gap 104 such that the second fixed blade set 80 may be inserted into the gap 104 and further engaged with the door lock 106. The device 10 may then be actuated to break the lock 106 or otherwise breach the door 100 with the second fixed blade set 80 and the second moving blade 82. When the second fixed blade set 80 is engaged, the extension of the second moving blade 82 from the two second fixed blades 84 creates the widening of the door gap 104 to complete the breach.

Figure 3:
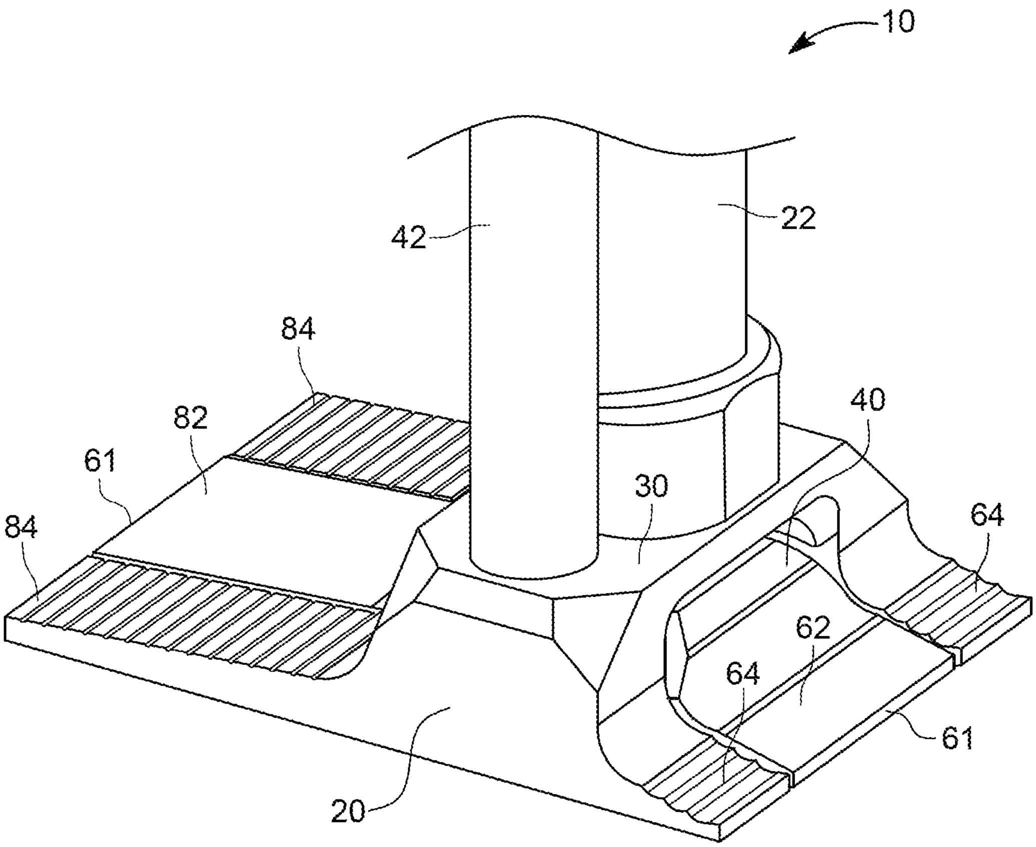
FIG. 3 is a closeup perspective view of the first fixed blade set, the second fixed blade set, and a portion of the moving breaching structure of the device.

FIG. 3 is a close up view of the first fixed blade set 60 and the second fixed blade set 80. The blades 64 of the first fixed blade set 60 are configured to be of shorter length than the blades 84 of the second fixed blade set 80. The reduced length of the first fixed blade set 60 allows the device 10 to be used with shallow and/or narrow door gaps 104. FIG. 3 further depicts the orientation of the first blade set 64 and the second blades 84 prior to the actuation of the device 10. The first moving blade 62 and the two first fixed blades 64 are oriented on the same plane and may be of substantially the same shape but not limited thereto. Similarly, the second moving blade 82 and the two second fixed blades 84 are oriented on the same plane and may be of substantially the same shape but not limited thereto. The initial orientation allows the user to insert the blades 64 and 62 or the blades 84 and 82 into the door gap 104. Once actuated, the first moving blade 62 moves away from the two first fixed blades 64 and the second moving blade 82 moves away from the two second fixed blades 84.

Figure 4:
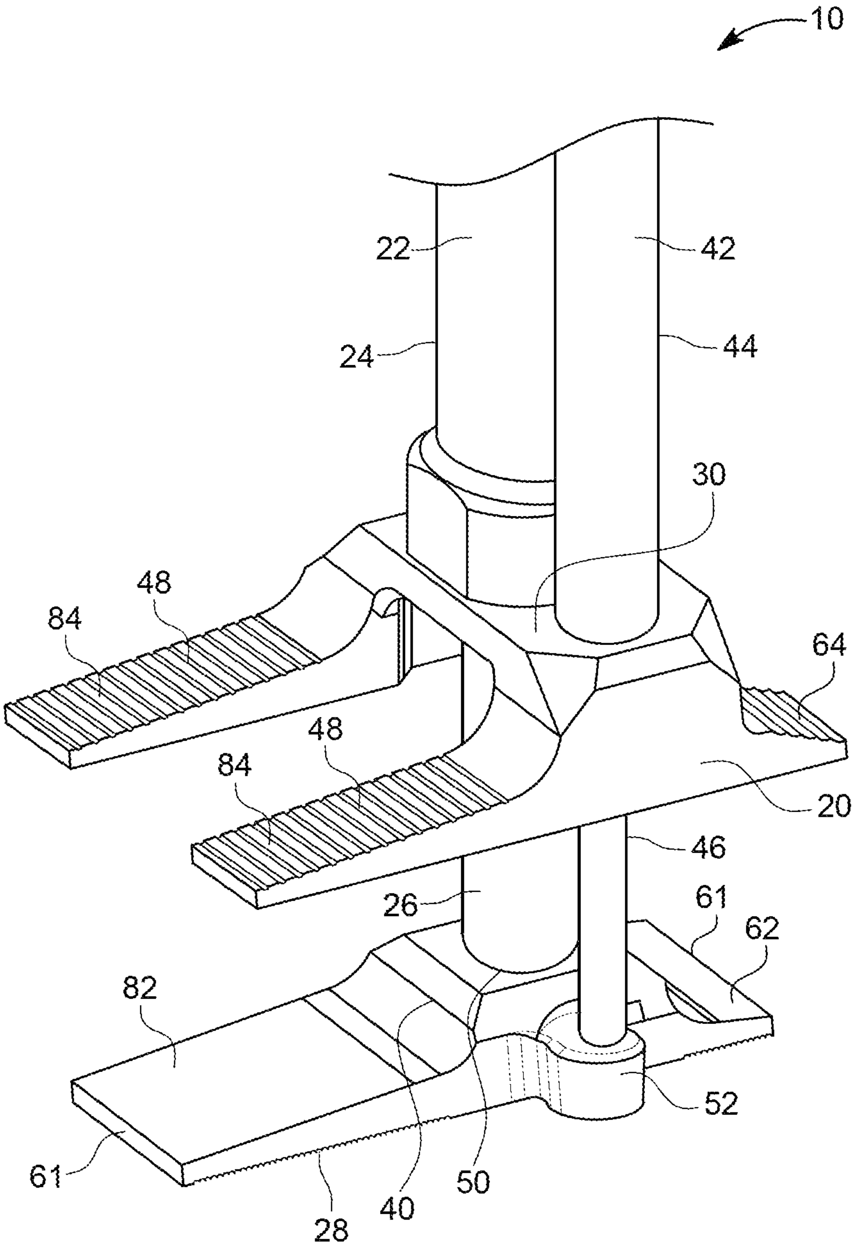
FIG. 4 is a left side perspective view of the first fixed blade set and the second fixed blade set of the device with the moving breaching structure partially extended from the first blade set and the second blade set.

FIG. 4 depicts an embodiment of the device 10 with the moving breaching structure 40 extended. The moving breaching structure 40 moves away from the fixed breaching structure 20, creating a separating force on the space in which the device 10 was initially placed. The first extension 26 and second extension 46 extend outward from the first housing 24 and second housing 44, respectively. The blades 64 and 84 of the fixed breaching structure 20 optionally include gripping elements 48 that enhance the grab of those blades to the door 100. The blades 62 and 82 of the moving breaching structure 40 optionally include gripping elements 28 that enhance the grab of those blades to the door frame 102. The gripping elements 28 and 48 may be stepped or knurled, for example. The separating force between the fixed breaching structure 20 and the moving breaching structure 40 generates an increasingly large door gap 104 between the door frame 102 and the door 100 until the door 100 is breached.

Figure 5:
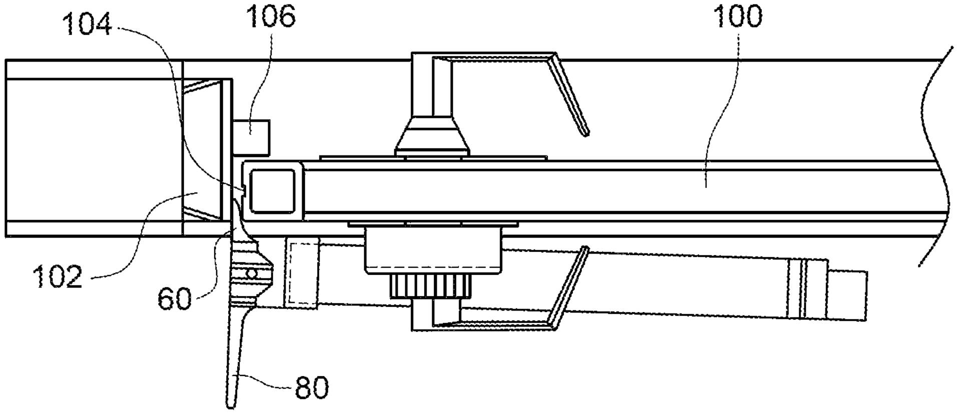
FIG. 5 is a left side view of the device of the present invention showing the first fixed blade set engaged in a narrow gap of a door before breaching.
Figure 6:
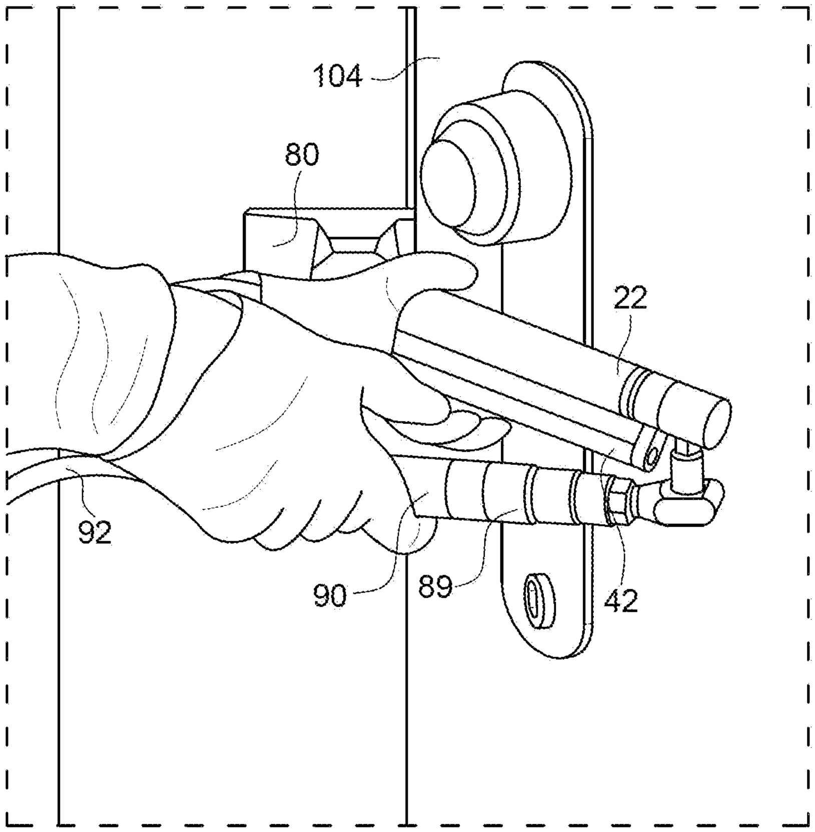
FIG. 6 is a rear side perspective view of the device of the present invention showing the first fixed blade set engaged in a narrow gap of a door before breaching.
Figure 7:
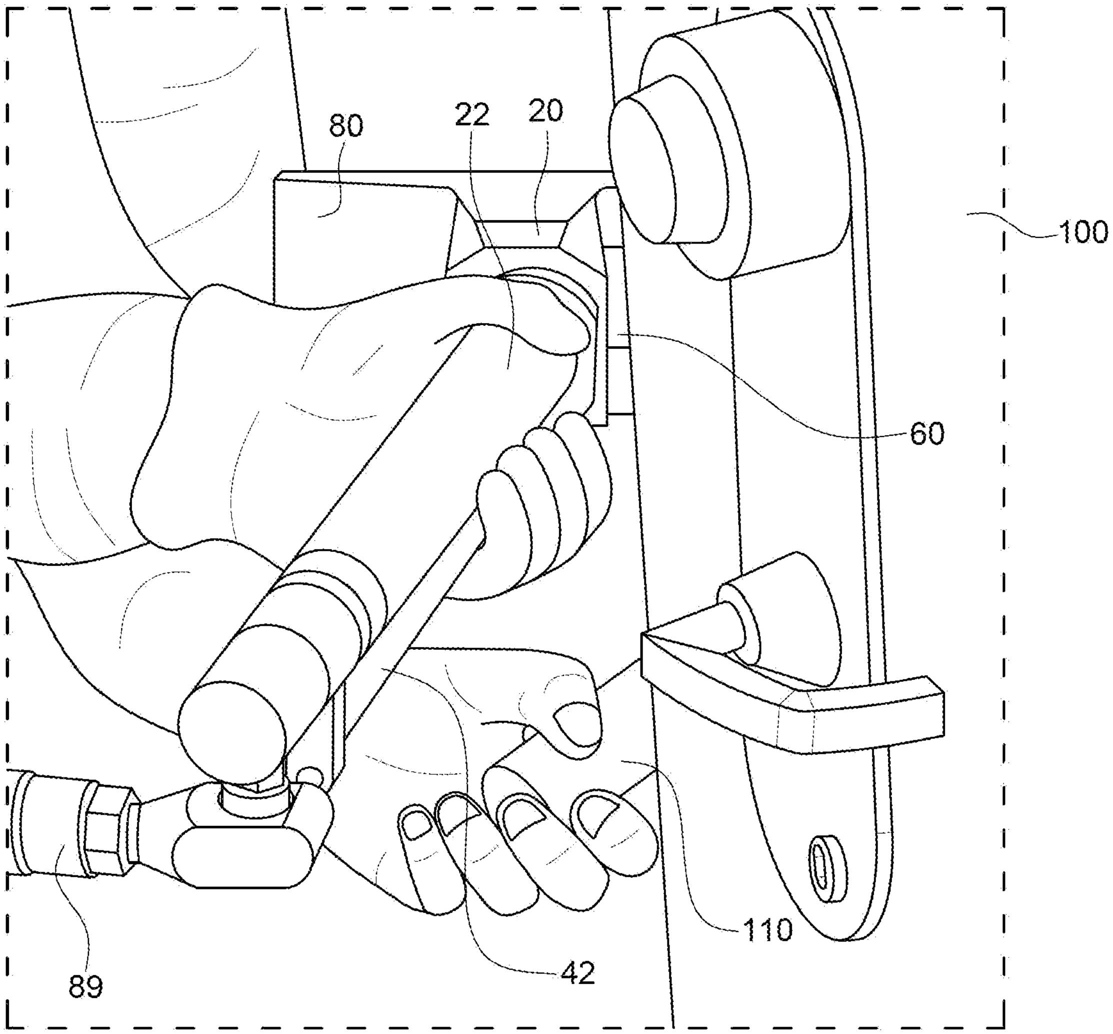
FIG. 7 is a top side perspective view of the device of the present invention showing the first fixed blade set engaged in a narrow gap of a door during breaching with the use of a wedge.

FIGS. 5-7 depict the device 10 in use with a door 100. The first fixed blades 64 and the first moving blade 62 are inserted into the door gap 104. As depicted in FIG. 5, the door gap 104 is a relatively shallow, narrow space in which the second blade set 80 would not be optimal. The first actuation element 22 and the second actuation element 42 are substantially parallel to the door 100 when the device 10 is initially engaged. Upon actuation, the fixed breaching structure 20 remains engaged with the door 100 and the moving breaching structure 40 remains engaged with the door frame 102. As the moving breaching structure 40 extends away from the fixed breaching structure 20, the door 100 is forced away from the door frame 102, creating a larger gap space 104.

As represented in FIG. 6, the user may control the movement of the moving breaching structure 40 with the controls on the power source 90. The hydraulic hose 92 is connected to the device 10. As shown in FIG. 7, the door 100 is partially breached following the use of the first fixed blade set 60, creating a widened door gap 104. The widened door gap 104 is such that the second fixed blade set 80 may then be inserted into the door gap 104 to complete the breach. To maintain the opening after the initial partial breach with the use of the first fixed blade set 60, an optional wedge or pry tool 110 may be used before re-orienting the device 10 with the second fixed blade set 80 to be inserted into the wider gap 104.

Figure 8:
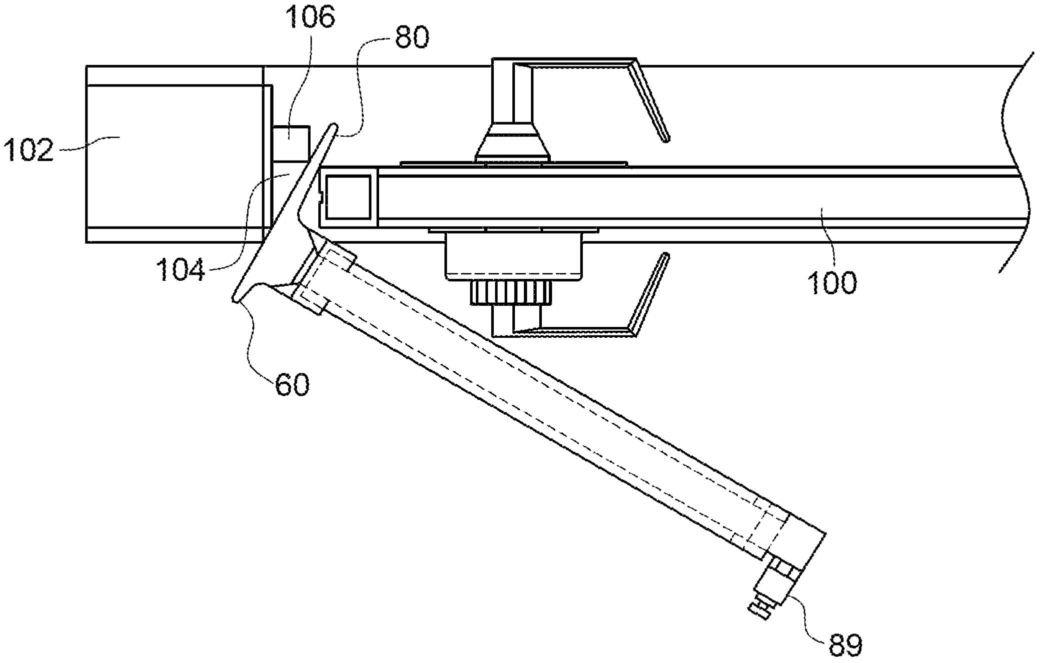
FIG. 8 is a left side view of the device of the present invention showing the second fixed blade set engaged in the wider gap to cause door breach.
Figure 9:
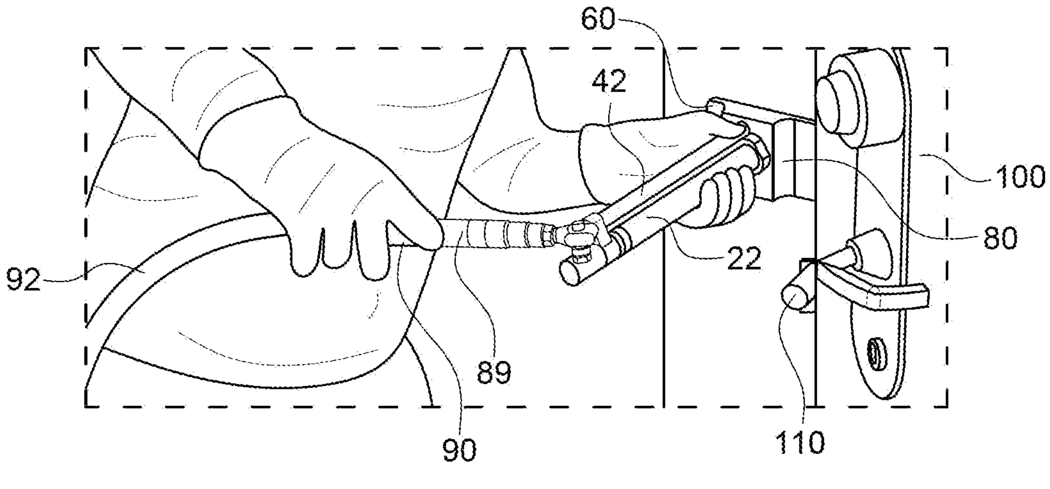
FIG. 9 is a front side perspective view of the device of the present invention showing the second fixed blade set engaged in the wider gap established by the first fixed blade set to cause door breach.
Figure 10:
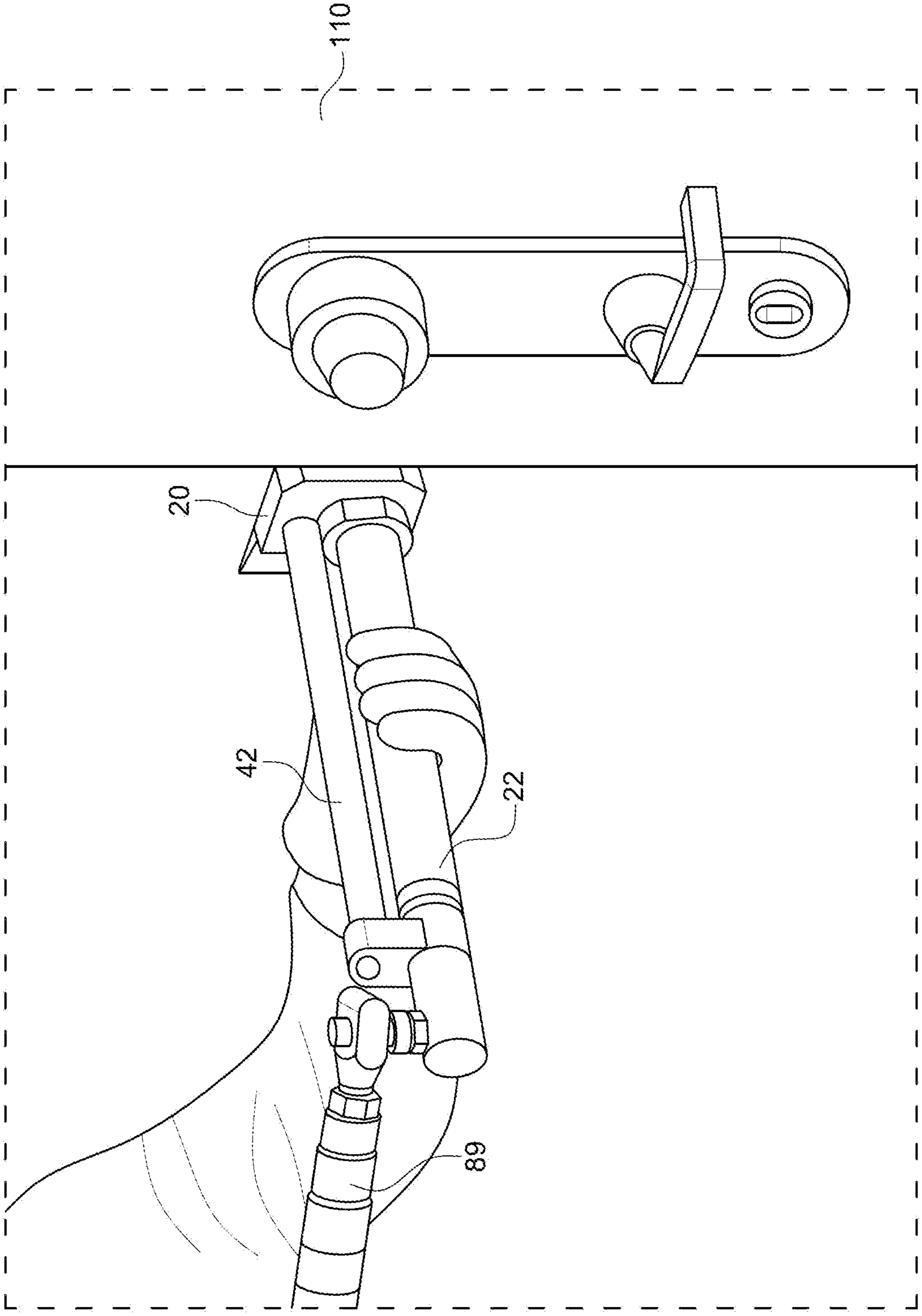
FIG. 10 is the front side perspective view of the device of the present invention showing the second fixed blade set engaged in the wider gap established by the first fixed blade set to cause door breach with the moving breaching structure actuated.

FIGS. 8-10 depict the device 10 in use with a door 100. The second fixed blades 84 and the second moving blade 82 are inserted into the widened door gap 104. Following use of the device 10 as represented in FIGS. 5-7, the user may utilize the second fixed blades 84 and the second moving blade 82 of the device 10 to complete the breach. As depicted in FIG. 8, the second fixed blades 84 and the second moving blade 82 extend further into the widened door gap 104 created by the use of the first blades 64 and 62. The second blades 84 and 82 create greater leverage and angle to complete the breach, or extend past the door lock 106, for example. Once actuated in the position as represented in FIGS. 8-10, the moving breaching structure 40 extends away from the fixed breaching structure 20, until such time as the door 100 is disengaged at least partially from the door frame 102.

As noted, the user may utilize the wedge or pry tool 110 in conjunction with the use of the device 10. After the user has utilized the first blades 64 and 62 of the device 10 to create a larger door gap space 104, the wedge or pry tool 110 may be inserted into the door gap 104 to maintain the widened space. The wedge or pry tool 110 allows the user to remove, rotate, or otherwise manipulate the device 10 to such a position that the second blades 84 and 82 may be inserted into the door gap 104 as depicted in FIGS. 8-10. In an embodiment of the device 10, after the user has utilized the first blades 64 and 62 to widen the door gap 104, the user may use the wedge or pry tool 110 to maintain the space. The device 10 is retracted to the original position as depicted in FIG. 1 wherein the fixed breaching structure 20 and moving breaching structure 40 are oriented in substantially the same plane. The second actuation element 42 may facilitate the retraction of the moving breaching structure 40 to the fixed breaching structure 20 through the use of an internal mechanical return spring, gas filled return spring, or other retraction method. The device 10 is then rotated 180-degrees, such that the user may engage the second blades 84 and 82 with the door 100 and the door frame 102 within the door gap 104. The widened door gap 104 may now be suitable for the second blades 84 and 82 to gain deeper access into the door gap 104 to be able to provide outward, separating force on the door 100, away from the door frame 102 and door lock 106, such that the door 100 is breached.

Figure 11:
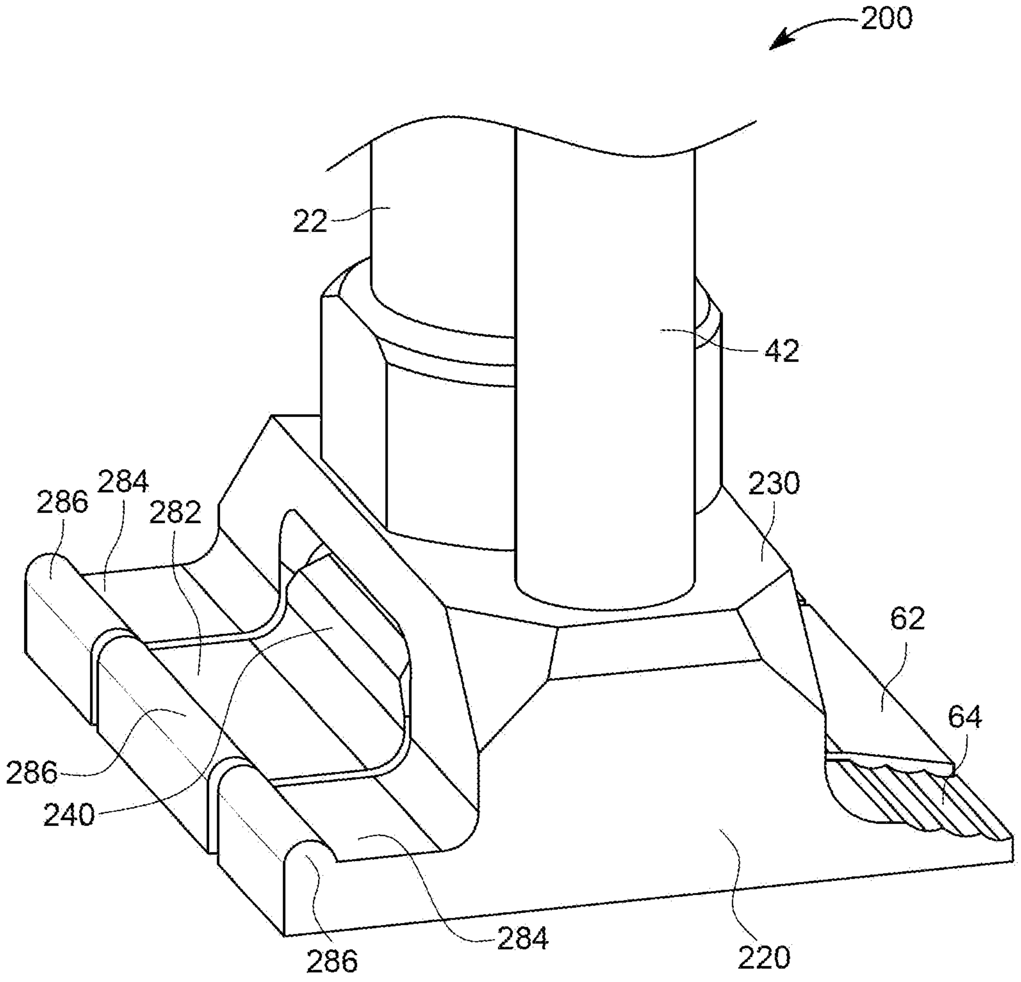
FIG. 11 is a side perspective view of a second embodiment of the device having a second embodiment of the second fixed blade set for breaching a ship hatch.
Figure 12:
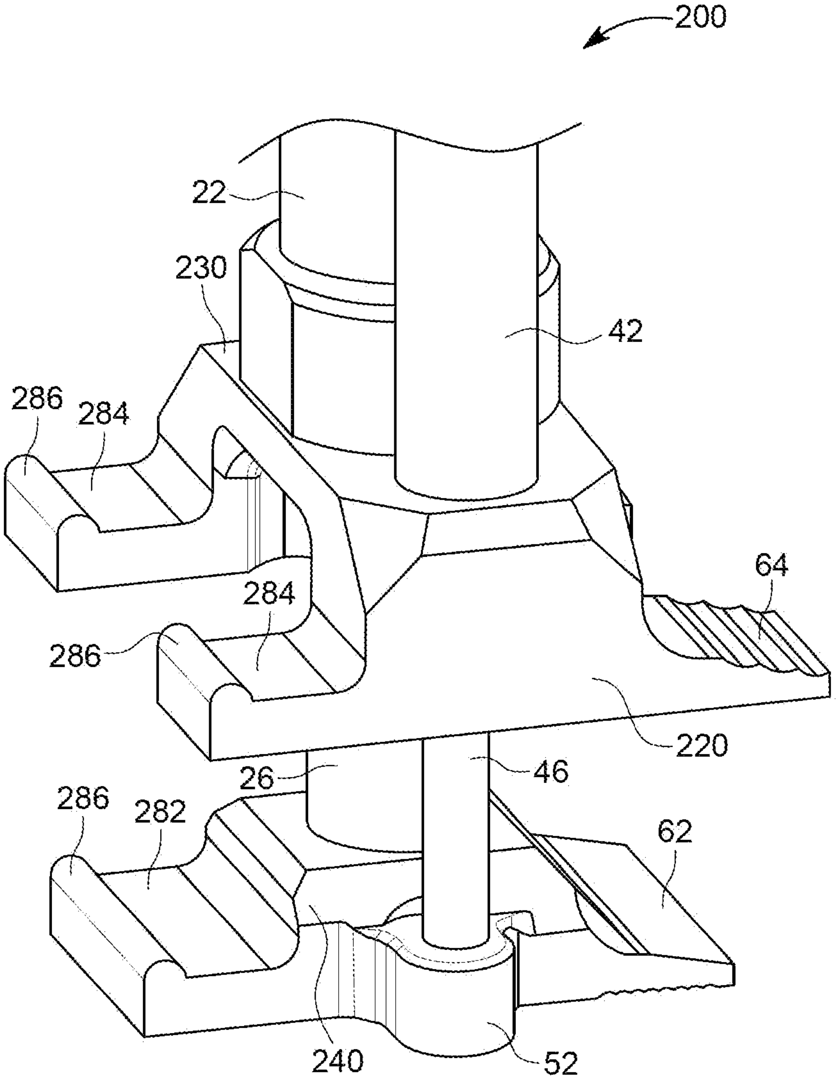
FIG. 12 is a side perspective view of the device of FIG. 11 showing the moving breaching structure partially extended.
Figure 13:
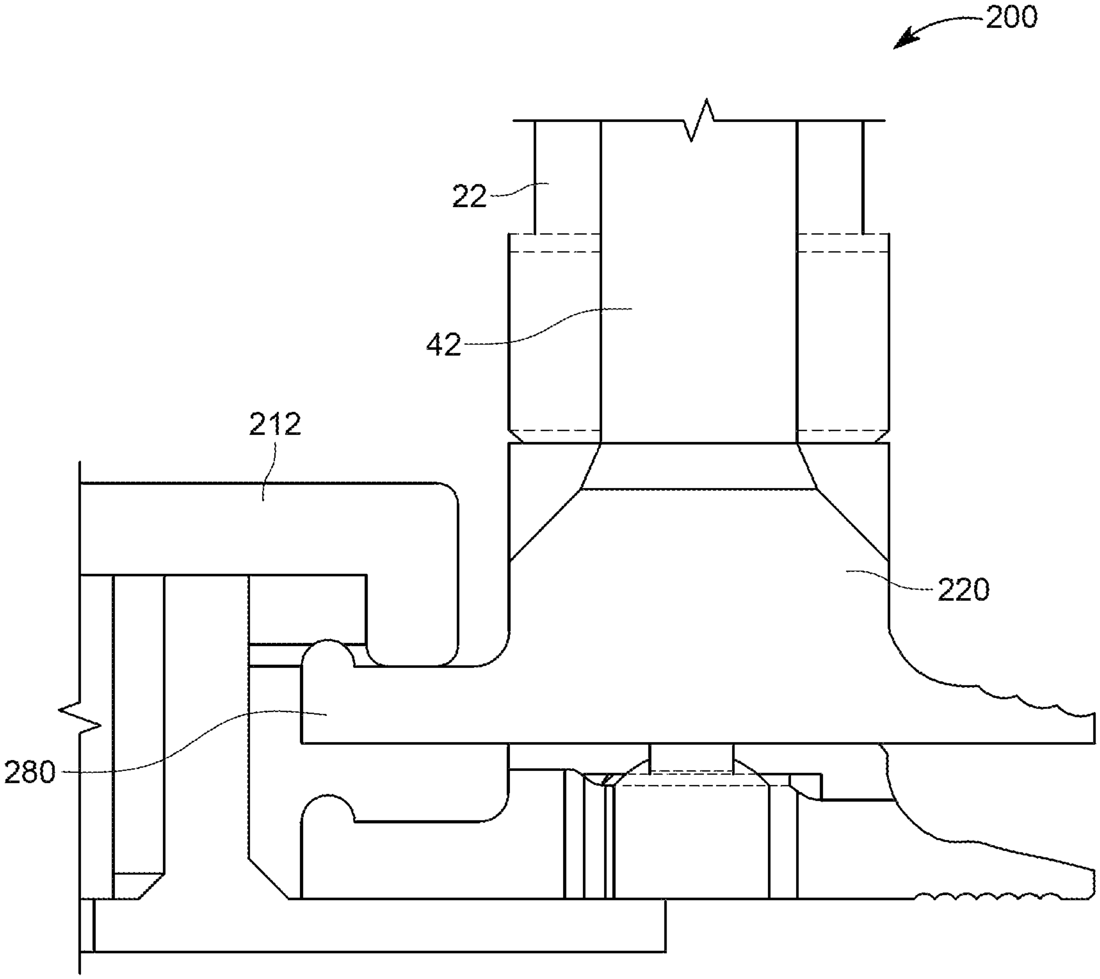
FIG. 13 is a left side perspective view of the device of FIG. 11 engaged with a ship hatch.

FIGS. 11-13 depict a second embodiment of the device 200 having the first moving blade 62 and the two first fixed blades 64 as previously depicted in FIGS. 1-10, a fixed breaching structure 220, a moving breaching structure 240, a second moving blade 282, and two second fixed blades 284. The two second fixed blades 284 are spaced apart from one another by the second moving blade 282. The two second fixed blades 284 are coupled together by a fixed collar 230 of a fixed breaching structure 220. The two first fixed blades 64 are coupled together by the fixed collar 230 of the fixed breaching structure 220. The second moving blade 282 and the two second fixed blades 284 are each equipped with a blade shoulder 286. The blade shoulder 286 is configured to enable the engagement with a structure or entry, having a curved component, such as that of a ship hatch.

FIG. 11 depicts the orientation of the two first fixed blades 64 and the two second fixed blades 284 prior to the actuation of the device 200. The first moving blade 62 and the two first fixed blades 64 are oriented on the same plane and may be of substantially the same shape but not limited thereto. Similarly, the second moving blade 282 and the two second fixed blades 284 are oriented on the same plane and may be of substantially the same shape but not limited thereto. The initial orientation allows the user to insert the blades 64 and 62 or the blades 284 and 282 into the structure that will be breached. Once actuated, the moving breaching structure 240 extends away from the fixed breaching structure 220 and the first moving blade 62 moves away from the two first fixed blades 64 and the second moving blade 282 moves away from the two second fixed blades 284.

FIG. 12 depicts the second embodiment of the device 200 with the moving breaching structure 240 extended away from the fixed breaching structure 220. The moving breaching structure 240 moves away from the fixed breaching structure 220, creating a separating force on the space in which the device 200 was initially placed. The extension of the moving breaching structure 240 away from the fixed breaching structure is actuated by the first extension 26 and the second extension 46 extending outward from the first housing 24 and the second housing 44, respectively, as shown previously in FIG. 4.

FIG. 13 depicts the device 200 engaged with a ship hatch 212. The blade shoulder 286 of the second moving blade 282 and the two second fixed blades 284 is configured to enable engagement with a structure, such as the ship hatch 212. The second moving blade 282 and the two second fixed blades 284, collectively, form a second blade set 280. As depicted in FIG. 13, the second embodiment of the device 200 may be modified to have only the two second fixed blades 284 and the second moving blade 282, each with the blade shoulder 286 that extends from the end of the two second fixed blades 284 and the second moving blade 282.

A method of the present invention includes a number of steps to complete a breach into an entry or exit. A first gap opener of a breaching device such as the breaching device 10 described herein, is inserted into a space between the door and door frame. A first point of contact is engaged with the door frame and a second point of contact is engaged with the door. The first gap opener is actuated such that the first point of contact moves away from the second point of contact using applied pressure, such as hydraulic pressure. The movement creates a widened space between the door and door frame. The first gap opener is then removed from the space between the door and door frame, rotated 180-degrees, and the device is retracted to its original position. A second gap opener of the device is then inserted into the widened space between the door and door frame whereby a third point of contact is engaged with the door frame and a fourth point of contact is engaged with the door. The second gap opener is then actuated such that the third point of contact moves away from the fourth point of contact using hydraulic pressure. The movement completes the breach of the door. The method includes an optional step of placing a wedge or pry tool to maintain the opening after the first gap opener has widened the space. Additionally, the step of retracting the first point of contact and the second point of contact to the original position may be completed before or simultaneously during the step of removing the device from the space between the door and door frame or before or simultaneously during the step of rotating the device 180-degrees.

In another method of the invention a method is provided for breaching a first door type and a second door type with a single gap opener device. The steps of this method include inserting a first gap opener of a gap opener device into an original gap between a first door type and a first door frame such that a first point of contact is engaged with the first door frame and a second point of contact is engaged with the first door type, actuating the first gap opener whereby the first point of contact and the second point of contact extend away from each other until the first door type is breached, removing the gap opener device from the first door type, rotating the gap opener device 180-degrees, inserting a second gap opener of the gap opener device into a gap between a second door type and a second door frame such that a third point of contact is engaged with the second door frame and a fourth point of contact is engaged with the second door type, and actuating the gap opener device whereby the third point of contact and the fourth point of contact extend away from each other until the second door type is breached.

The present invention has been described with reference to specific examples and configurations. The description is not to be taken in a limiting sense but is made merely for the purpose of illustrating the general principles of the invention, since the scope of the invention is best defined by the appended claims.

What is claimed is:

1. A breaching tool device, the device comprising:
a fixed breaching structure;
a moving breaching structure;
a first fixed blade set and a second fixed blade set of the fixed breaching structure;
a first moving blade and a second moving blade of the moving breaching structure;
a first actuation element having a first housing and a first extension;
a second actuation element having a second housing and a second extension; and
a power source coupling;
wherein the fixed breaching structure is coupled to the first housing and the second housing;
wherein the moving breaching structure is coupled to the first extension and the second extension;
wherein the power source coupling is arranged for connection to a power source selected to cause movement of the moving breaching structure by movement of the first extension and the second extension; and
wherein actuation of the device extends the moving breaching structure away from the fixed breaching structure with the first extension extending away from the first housing and the second extension extending away from the second housing.

2. The device of claim 1 further comprising a fixed collar for connecting the first fixed blade set and the second blade set together and to the first housing and the second housing.

3. The device of claim 1 further comprising a moving collar connecting the first moving blade and the second moving blade together.

4. The device of claim 3 wherein the moving collar is further arranged to couple the first extension and the second extension to the first moving blade and the second moving blade.

5. The device of claim 1 wherein the power source supplies power to the device to control the movement of the moving breaching structure.

6. The device of claim 5 wherein the power source is selected from hydraulic, pneumatic, mechanical, or electrical.

7. The device of claim 1 wherein each of the first fixed blade set and the second fixed blade set includes one or more fixed blades.

8. The device of claim 7 wherein the first fixed blade set includes two first fixed blades, and wherein the two first fixed blades are spaced from one another by the first moving blade.

9. The device of claim 8 wherein the second fixed blade set includes two second fixed blades, and wherein the two second fixed blades are spaced from one another by the second moving blade.

10. The device of claim 9 wherein a length of the two first fixed blades is substantially the same, and wherein the length of the two first fixed blades is less than a length of the two second fixed blades.

11. The device of claim 7 wherein all of the blades have a wedge shape.

12. The device of claim 1 wherein the first extension is movably retained in the first housing and the second extension is movably retained in the second housing.

13. The device of claim 1 wherein at least a portion of the first fixed blade set and the second fixed blade set include gripping elements.

14. The device of claim 1 wherein the first fixed blade set is configured to open a first type of structure and the second fixed blade set is configured to open a second type of structure, wherein the first type of structure and the second type of structure are different from one another.

15. A breaching tool device, the device comprising:

a fixed breaching structure;

a moving breaching structure;

a fixed blade set of the fixed breaching structure having a first blade spaced from a second blade;

a moving blade of the moving breaching structure positioned between the first blade and the second blade of the fixed blade set;

a first actuation element having a first housing and a first extension;

a second actuation element having a second housing and a second extension; and a power source coupling;

wherein the fixed breaching structure is coupled to the first housing and the second housing;

wherein the moving breaching structure is coupled to the first extension and the second extension;

wherein each of the first blade and the second blade of the fixed blade set and the moving blade is configured with a blade shoulder;

wherein the power source coupling is arranged for connection to a power source selected to cause movement of the breaching structure by movement of the first extension and the second extension; and wherein actuation of the device extends the moving breaching structure away from the fixed breaching structure with the first extension extending away from the first housing and the second extension extending away from the second housing.

* * * * *